US006766414B2

(12) United States Patent
Francis et al.

(10) Patent No.: US 6,766,414 B2
(45) Date of Patent: Jul. 20, 2004

(54) METHODS, APPARATUS AND SYSTEM FOR CACHING DATA

(75) Inventors: Michael Huw Francis, Winchester (GB); Simon Walsh, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/848,034

(22) Filed: May 3, 2001

(65) Prior Publication Data

US 2002/0004885 A1 Jan. 10, 2002

(30) Foreign Application Priority Data

May 4, 2000 (GB) .............................................. 0010648

(51) Int. Cl.[7] .............................................. G06F 12/00
(52) U.S. Cl. ..................... 711/113; 711/112; 711/118; 369/44.28; 369/44.29; 369/44.38; 369/44.39
(58) Field of Search ................................ 711/113, 128, 711/144, 112, 161, 162; 369/44.28, 44.29, 44.38, 44.39

(56) References Cited

U.S. PATENT DOCUMENTS

| 5,138,599 A | * | 8/1992 | Fukushima et al. ...... 369/30.13 |
| 5,604,646 A | * | 2/1997 | Yamawaki ................... 360/53 |
| 5,644,791 A | * | 7/1997 | Brady et al. .................. 710/68 |
| 5,708,668 A | | 1/1998 | Styczinski .................... 371/40 |
| 5,748,874 A | | 5/1998 | Hicksted et al. ............ 395/182 |
| 5,754,888 A | * | 5/1998 | Yang et al. ................... 710/52 |
| 5,761,702 A | * | 6/1998 | Matsufuji ................... 711/103 |
| 5,892,980 A | * | 4/1999 | Tal et al. ...................... 710/56 |
| 6,092,130 A | * | 7/2000 | Horiike ........................ 710/69 |
| 6,119,201 A | * | 9/2000 | Kulakowski et al. ....... 711/112 |
| 6,240,140 B1 | * | 5/2001 | Lindbergh et al. .......... 375/260 |
| 6,279,136 B1 | * | 8/2001 | Kulakowski et al. ....... 714/769 |
| 6,359,844 B1 | * | 3/2002 | Frank .......................... 369/32 |
| 6,381,239 B1 | * | 4/2002 | Atkinson et al. ........... 370/362 |
| 6,389,062 B1 | * | 5/2002 | Wu ............................. 375/222 |
| 6,389,510 B1 | * | 5/2002 | Chen et al. ................. 709/213 |
| 6,421,761 B1 | * | 7/2002 | Arimilli et al. ............. 711/128 |
| 6,438,661 B1 | * | 8/2002 | Beardsley ................... 711/144 |
| 6,449,110 B1 | * | 9/2002 | Degroat et al. .............. 360/46 |

* cited by examiner

*Primary Examiner*—Donald Sparks
*Assistant Examiner*—Ngoc V Dinh
(74) *Attorney, Agent, or Firm*—Kunzler & Associates

(57) ABSTRACT

The invention relates to caching data in a data processing system including a host computer and a storage subsystem including at least one customer disk and a cache disk. Write transactions are received specifying data to be written to at least one customer disk and these are cached in a volatile memory of the storage subsystem and written to the cache disk. The transaction data is written sequentially to the cache disk when available. In the intervening periods (i.e., when no transaction data is available), padding data is instead written sequentially to the cache disk.

24 Claims, 8 Drawing Sheets

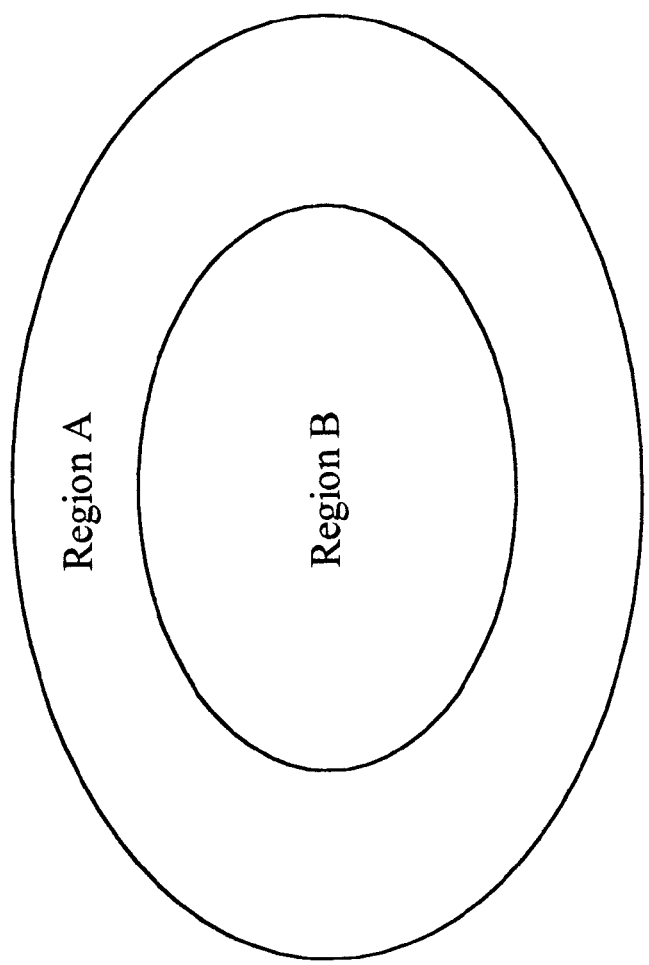

METHODS, APPARATUS AND SYSTEM FOR CACHING DATA

BACKGROUND OF THE INVENTION

1. Field of the Invention

The present invention relates to the data processing environment, and more particularly to data caching within such an environment.

2. Background and Related Art

The business world has become extremely reliant upon information technology, and computers now form the backbone of an ever-increasing number of large organizations. While personal computers (PCs), running office applications such as word processors, spreadsheets, databases, etc., have probably the highest visibility, data storage and transaction processing systems have a huge role to play behind the scenes. For example, such a system will typically form the basis of a supermarket's stock control. As another example, a bank will store details of all its customers and their accounts using such a system. Thus, every time a customer withdraws money via an ATM, or accesses one of the machine's other services, their transaction may be recorded in a data storage subsystem.

FIG. 1 shows a data processing system according to the prior art. A host 10, which may for example be an RS/6000 available from the IBM Corporation, includes an adapter card 20 which will typically plug into a PCI slot within the machine. The adapter is accessed via device driver 30 and includes an on-board fast-write cache 40. The host is connected to a network 50 through which it accesses a plurality of customer disks 61 to 64. These disks may form a Redundant Array of Independent Disks (RAID). Each disk may store, for example, 10 Gigabytes of data and is divided into a number of logical blocks. When access to a portion of this data is required, this is specified via a logical block address (LBA).

The host machine may process thousands of transactions 5 an hour. As each transaction arrives at the host, it is stored in local memory (not shown). The device driver 30 is informed and creates a transaction control block (TCB) which includes information such as transaction type (e.g., read or write), the relevant disk number, the address on the disk (LBA), the length of the relevant data, etc. This information is then copied into a control block structure local to the adapter.

In a system without cache memory, the adapter subsequently looks in the appropriate TCB to determine the transaction type and other pertinent details (see above) and then requests data from a specified customer disk or retrieves data from local memory and writes it to a customer disk. This achieved, a completion status is returned to the host which is then ready to process the next transaction. For example, in a banking system if a customer wishes to take money out of their current account, it is first necessary to verify via the disk that they have the funds to do so. It is then necessary to subtract the appropriate amount from their account balance and to write the new total. Thus, a number of read and write transactions are invoked.

A conventional disk rotates at approximately 10,000 rpm. When a command is received from the adapter, the logical block address specified is mapped to a physical cylinder, head number and block number; the combination of cylinder and head numbers defines the track number. The first step is for the disk drive housing the disk to move its actuator to the correct cylinder on the disk. This is known as seek time. In parallel with the seek, the required head is selected so that, when the seek completes, the required track is present at the selected head. Subsequently, the actuator has to wait for the disk to rotate round to the specified block number before it can begin reading or writing to the disk. This is known as latency. The combination of seek time and latency means that an LBA access can take on average 10–15 ms. Since disk access in such a system is typically quite heavy, this time is simply unacceptable.

Data caching is used to alleviate this problem. As previously mentioned, the adapter 20 of FIG. 1 has an on-board fast-write cache 40. As before a transaction 5 is stored in host memory and the device driver creates a TCB for it. This is used to determine the transaction type; and if it is a write, then the relevant data is retrieved from host memory. This time however the data is stored in the cache for background processing and a completion status returned to the host 10 subsequent to the transfer into the on-board cache (but prior to the background processing). Such processing can take place at a later date when transaction data can be written to the appropriate customer disk from the on-board cache (known as destaging); meanwhile, the host and adapter can be receiving and dealing with further transaction requests.

It will be appreciated that the cache 40 is typically a volatile random access memory (RAM). Hence if the host is powered down (whether on purpose or by accident) or the host simply dies, or indeed the adapter fails, the cached data is lost. This is not a problem if the data contained within has already been destaged to the appropriate customer disk; but if it hasn't, then the transaction could be lost forever since the host 10 has already received a completion status for it (i.e., as soon as the transaction was written to the on-board cache).

Thus, many storage subsystems have introduced an element of fault tolerance. A typical solution is to mirror the data to a second cache 85 on another adapter 80 plugged into a second host 70. If one adapter then becomes unavailable, the other can flush the data to the appropriate customer disk, thereby preserving data integrity. This is known as an owner/partner configuration.

Although adapters 20 and 80 have been shown as being on different machines, it is quite likely that they will both be plugged into one machine. If this is the case, then at least one cache or memory must have battery backup (not shown) so that data is preserved in the event of power loss on the host. Battery-backed RAM obviously has a performance advantage in terms of lower latency and higher bandwidth; however, it also comes fraught with problems. One issue is the very limited space available to house a battery on a PCI adapter card. Furthermore, NiCd batteries are toxic, yet other rechargeable technologies cannot survive the high temperatures encountered in an adapter environment. Adapters can easily reach 60° C. and at that temperature the battery capacity degrades more quickly. Thus, such batteries have to be recharged periodically. They have a shelf life of approximately two years; but, in use, they last only two days. Periodic replacement of the batteries is inconvenient. Moreover, if for example a machine is unplugged on a long holiday weekend, the data is likely to be lost as the batteries will simply not hold out until the following Tuesday.

Cache with a battery-backup may be termed non-volatile since the data is not automatically lost if power is lost. There is a further problem associated with such a solution in that in the event of a failure the medium has to then be manually moved to a replacement adapter, with consequent delay and risk of physical damage and data loss (e.g., via electrostatic discharge).

Moreover, it is likely that the host 70 including the second adapter and on-board cache will also be receiving and processing its own set of transactions 7. It will therefore require host 10 to mirror its data. Thus, cache utilization (i.e., for transaction processing) will be half the size of the smallest cache, with half being used by its host to store transaction data, and the other half being used to mirror the other host's data. Such a setup therefore significantly reduces a system's ability to cache data.

There are additional problems associated with the owner/partner configuration of FIG. 1. Complex communication protocols are involved which are difficult to implement in a reliable way. For example, if the owner adapter fails, then the partner will take control. If, however, the owner resurfaces, there is an issue to resolve as to which adapter is caching and processing the transactions which originally belonged to the owner. Furthermore, many customers use four or even eight adapters, but this then prohibits the use of write caching. Processor utilization on the adapters is also high when mirroring data between adapters. Thus, overall system performance is reduced.

Rather than data being mirrored to a second adapter, it may instead be written to a dedicated disk (not shown) on the network which is accessible by all adapters in the system. In a system using RAID, it is common to designate one of the disks as a hotspare. This can be swapped in in the event of a disk failure within the array. It will be appreciated that the hotspare can be used as the dedicated cache disk in order to save expense. If a customer disk within the array then fails, data caching can be foregone and the hotspare substituted in in place of the failed disk. U.S. Pat. No. 5,708,668 discloses the use of such a disk.

It will be apparent that caching to such a dedicated disk will have the high latency and low bandwidth problems associated with writing directly to a customer disk. Writing directly to the customer disk is unlikely however to be sequential. U.S. Pat. 5,708,668 also teaches writing sequentially to the cache disk and incorporates a performance gap to reduce latency. This is appended to customer data and is of a predefined length. Its purpose is to ensure that by the time this performance gap has been written, another transaction is ready for processing immediately. However, if a transaction is available before the performance gap is completely written, latency is still a problem. Furthermore, this performance gap is mainly intended for the situation where there is a queue of transactions. It is therefore not helpful when the workload is light or not constant since the gap will not necessarily be long enough.

Another technique, described in U.S. Pat. No. 5,748,874, uses a reserved area of a disk for storing the contents of a controller cache. In this patent, cache data is only transferred to the reserved area on interruption of power to the controller.

OBJECTS AND SUMMARY OF THE INVENTION

It is an object of the present invention to provide an method, apparatus, and system for caching data that overcomes most or all of the problems described above as existing in the art. Accordingly, the present invention provides a method for caching data in a data processing system including a host computer and a storage subsystem including at least one customer disk and a cache disk, said method comprising the steps of: receiving write transactions specifying data to be written to the at least one customer disk; caching said write transactions in a volatile memory of said storage subsystem; writing said cached write transactions to the cache disk, said writing step including: when available, writing transaction data sequentially to the cache disk; and only when transaction data is unavailable, writing padding data sequentially to the cache disk.

Since transaction data is written on the cache disk whenever it is available, latency and seek time are greatly reduced. A specific address at which to write the data is no longer specified. Instead, such data is written at the point directly under a relevant actuator head of the disk drive housing the cache disk at that current moment in time. At all other times, padding data is written. Thus, even if the workload is light or just not constant, the data can still be written sequentially on the disk.

The cache disk eliminates the need for a battery-backup to the storage subsystem's volatile memory and hence all the problems that are associated with that (as described above). It also removes the need for a second adapter's volatile memory to be mirroring the first's transactions and thus having significantly less volatile memory space for storing its own set of transactions.

In the preferred embodiment assuming that no customer data is received, the padding data is written on a current track until the end of that track. The subsequent track is then switched to and remained upon until transaction data is available. Note, this may mean writing the padding data and then overwriting the padding data with new padding. This, however, ensures that a large portion of the disk is not wasted with unhelpful data.

Preferably, the cache disk is divided into at least two regions. The first of these is filled with transaction and padding data as appropriate, before the next region is written to in the same manner. At a point subsequent to the first region being filled with data, but before the last of the disk regions is completely filled with data, the first region is invalidated, such that it is ready to receive new data by the time the other regions are full.

According to the preferred embodiment, invalidation involves ensuring that all data contained within the first region has been destaged from the storage subsystem's volatile memory to the appropriate customer disks. Separating the two functions of writing and invalidating means that writes to one region can continue sequentially without being disrupted by the invalidation process taking place with regard to another region.

Preferably the transaction data is pre-pended with a header, which is used to distinguish the transaction data from the padding data on the cache disk. In the preferred embodiment, this header includes information about the transaction data such as the disk to which it is to be written, the LBA on that disk, the length of the data itself, a timestamp, etc. This information is used in the event of an unavailability of the data in volatile memory of the storage subsystem to destage the data contained on the cache disk to the appropriate customer disks. Thus, access to the customer data is always possible.

According to another aspect, the invention provides a method for caching data in a data processing system including a host computer and a storage subsystem including at least one customer disk and a cache disk, said cache disk being divided into at least two regions, the method comprising the steps of: receiving write transactions specifying data to be written to the at least one customer disk; caching said write transactions in a volatile memory of said storage subsystem; writing said cached write transactions to the cache disk, said writing step comprising: filling the first of said at least two regions with transaction data, before writing to another of said at least two regions.

In yet another aspect, the invention provides an apparatus for caching data in a storage subsystem including at least one customer disk and a cache disk, said apparatus comprising: a volatile memory; means for receiving write transactions specifying data to be written to the at least one customer disk; means, responsive to the receipt of said write transactions, for caching said write transactions in said volatile memory; and means for writing said cached write transactions to the cache disk, said writing means comprising: means for writing write transaction data, when available, sequentially to the cache disk; and means for writing said padding data sequentially to the cache disk only when transaction data is unavailable.

In yet another aspect, the invention provides a storage subsystem for caching data including the apparatus described above, at least one customer disk and a cache disk.

BRIEF DESCRIPTION OF THE DRAWINGS

A preferred embodiment of the present invention will now be described, by way of example only, and with reference to the following drawings:

FIG. 5 shows a cache disk according to a preferred embodiment of the present invention;

DETAILED DESCRIPTION OF THE PREFERRED EMBODIMENTS

Figure 1:
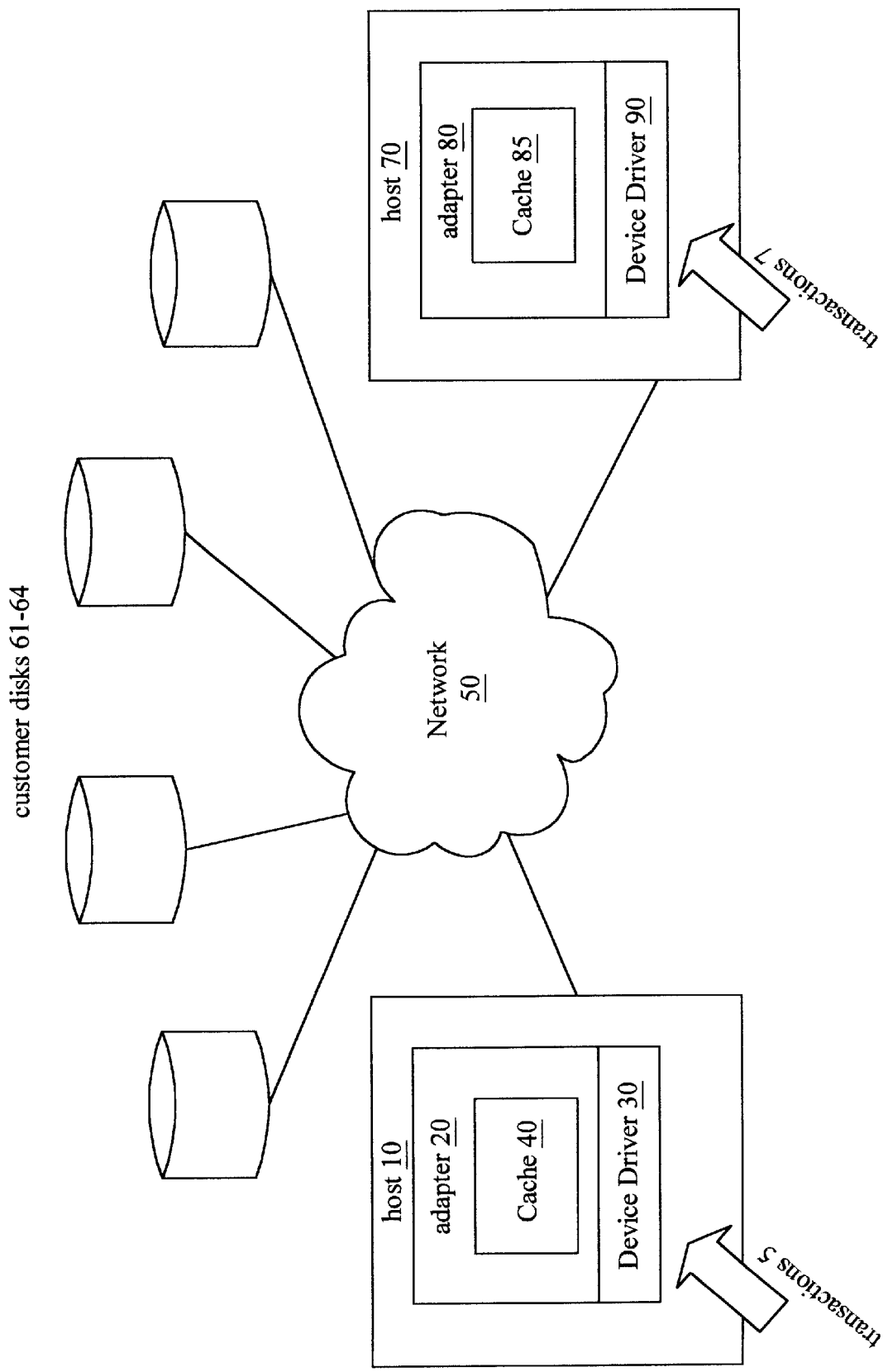
FIG. 1 shows a data processing system according to the prior art.
Figure 2:
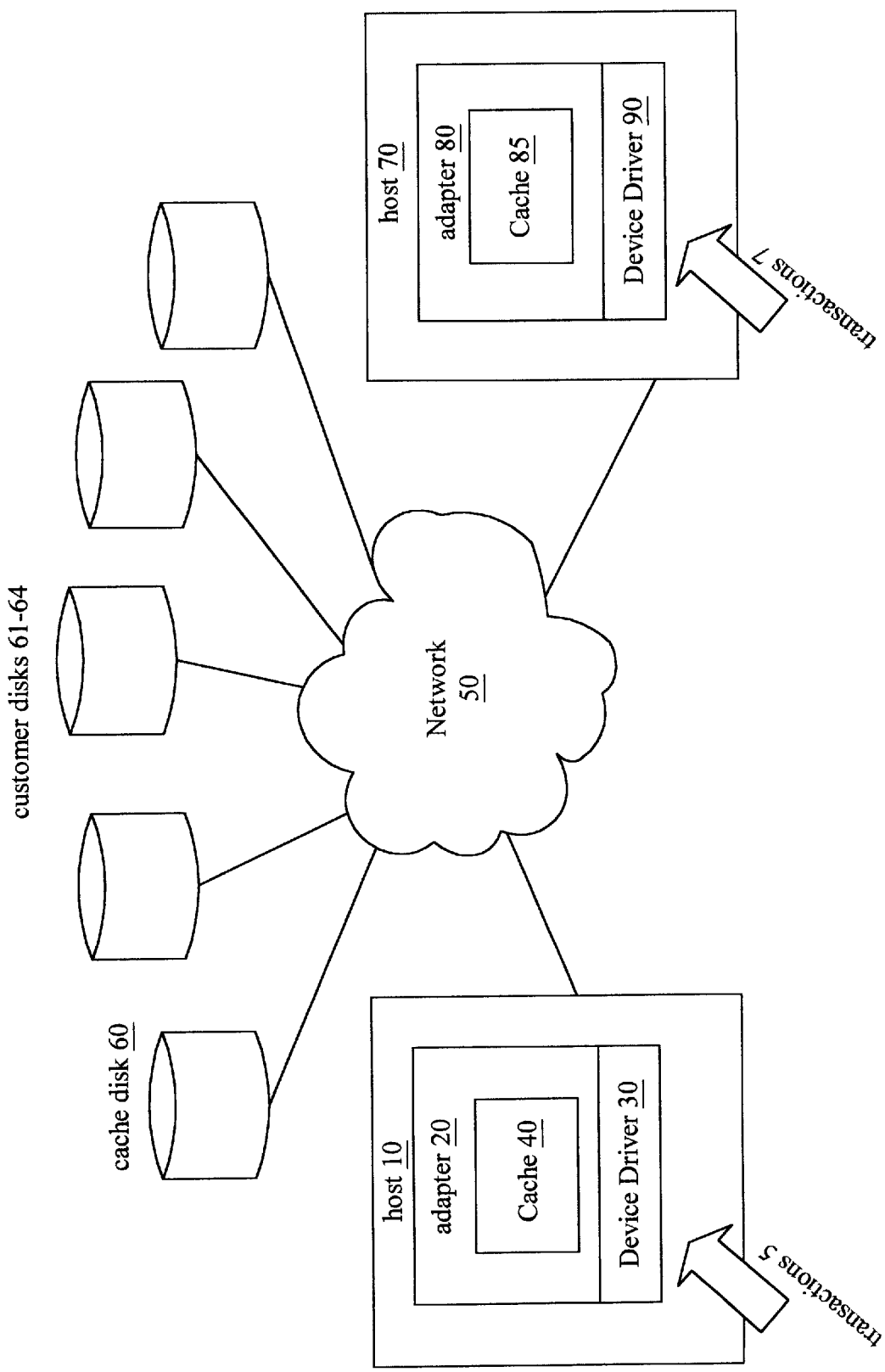
FIG. 2 illustrates the operating environment of a preferred embodiment of the present invention.

In a preferred embodiment, a storage adapter is configured to write the data contained within the adapter's on-board cache to a dedicated cache disk. FIG. 2 illustrates the operating environment of the preferred embodiment of the present invention. Note that such an environment has already been described above with reference to the prior art and FIG. 1. However, the cache disk 60 is now also shown.

According to the preferred embodiment, in a multi-adapter subsystem, each adapter has its own dedicated cache disk. Only one cache disk 60 is shown in FIG. 2; however, adapter 80 is also writing to its own cache disk. Alternatively, adapters may share a cache disk. Furthermore, it will be appreciated that the two adapters may be plugged into the same host. Moreover, each adapter 20, 80 could instead form their own separate controller unit, or equally form part of the same controller unit (i.e., not form part of a host machine at all).

In order to achieve high caching performance, it is important to reduce the delays in writing to the cache disk as far as possible by utilizing as much of the write bandwidth offered by the drive hardware as possible and thereby maintaining a high data transfer rate (i.e., by ensuring that the drive is writing whenever there is data available).

According to the prior art, to start writing to the drive housing the cache disk, the adapter issues a 'write' command to the drive, specifying a start address (LBA) and length. While the drive is writing the data for this write to the media, it may receive a subsequent write command. If it does, then the data for the new write is written to the media immediately following the end of the previous write's data. There is no delay due to seek or latency, so this is the best drive utilization that can be achieved. A short queue of transactions is maintained on both the adapter and the drive (as far as possible), such that it is always actively executing sequential write commands.

A problem occurs however when no customer transaction is available (for example if the workload is particularly light or just not constant). In existing designs, the adapter would simply issue the subsequent write whenever it was ready and the drive would wait for the specified LBA to arrive under the relevant actuator head before writing, therefore idling for, on average, half a revolution. Alternatively, the drive would have to wait while the performance gap described above is written before commencing writing the next customer transaction.

Figure 3:
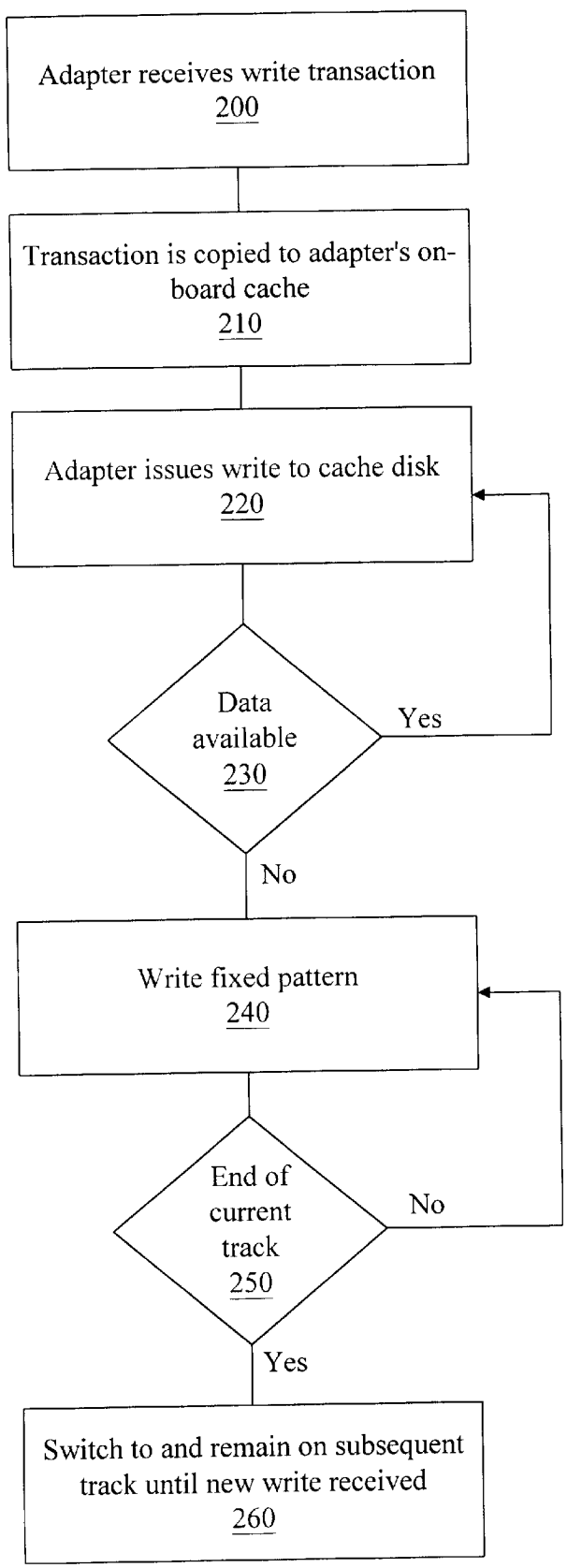
FIG. 3 is a flow chart of steps involved in writing transactions to the cache disk according to the preferred embodiment.

FIG. 3 is a flow chart of steps involved in writing transactions to the cache disk according to the preferred embodiment. It should be read in conjunction with FIG. 2.

In the preferred embodiment a transaction is received, preferably by a transaction receiving module, at the host 10 and a TCB created for it by the device driver 30. This is copied into a control block structure and is used by the adapter to determine the transaction type. For a "write" (step 200), the pertinent data is retrieved from host memory and is copied into the on-board cache (step 210).

The adapter then issues a write to the cache disk and the data is copied across (step 220). This is preferably accomplished by a cache module. Each copied data block is pre-pended with a header block including among other things a timestamp. The TCB is used to create this header block and thus the content is similar. It will not however include the transaction type. (See FIG. 8 for more detail.)

Figure 4A:
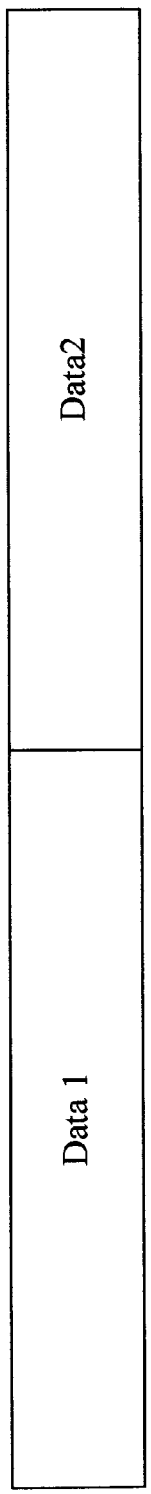
FIG. 4a illustrates a data pattern on a track on a cache disk where a second write is received by the storage adapter before the first has completed (or where a queue of transactions is maintained at the storage adapter) according to a preferred embodiment of the present invention.

As long as data is available, the adapter issues subsequent writes to the cache disk, preferably through a write transaction writing module, and hence one set of transaction data follows on from the next (steps 230, 220). FIG. 4a illustrates the resulting data pattern on the cache disk where the second write is received before the first has completed (or where a queue of transactions is maintained at the storage adapter) according to a preferred embodiment of the present invention.

Figure 4B:
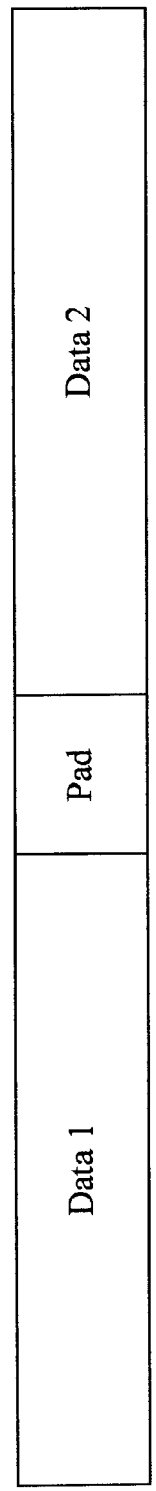
FIG. 4b shows a data pattern on a track on a cache disk where a second write is received soon after the first has completed according to a preferred embodiment of the present invention.

If however there is no data queued, the drive writes a fixed pattern of data (padding data), which is distinct from any block of data sent by the adapter, immediately following the end of the previously written data on the track. Preferably, this is conducted with a padding module. In the preferred embodiment, this pattern is '00' and is achieved via 'a write same' command in order to reduce bandwidth utilization. To ensure that it is possible to distinguish the padding data from the customer data, the header block starts with a non-zero field (see FIG. 8). Note, the drive starts writing transaction data wherever it is, as soon as data becomes available (i.e., in preference to the padding data). FIG. 4b shows the resulting data pattern on a track on the cache disk where the second write is received soon after the first has completed according to a preferred embodiment of the present invention.

Figure 4C:
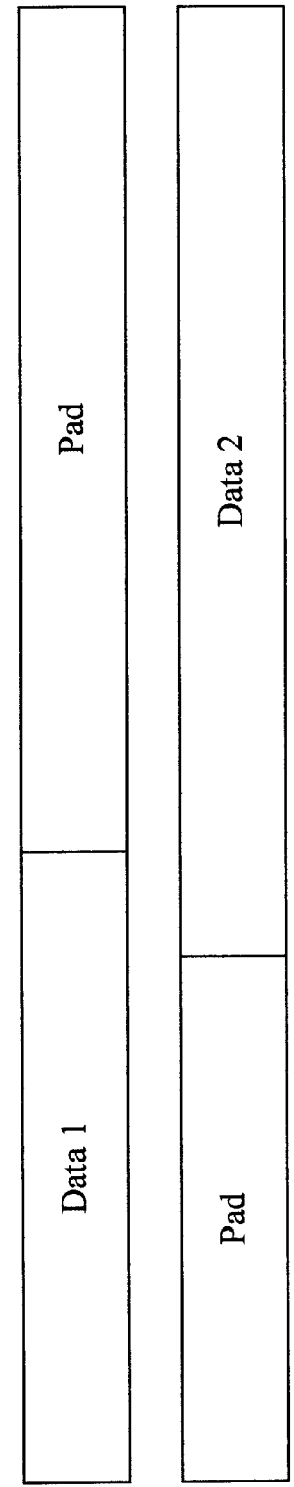
FIG. 4c shows a data pattern on two adjacent tracks on a cache disk where a long delay has occurred between the receipt of a first and second write command according to a preferred embodiment of the present invention.

Clearly a long period of idleness between write commands would result in large areas of the disk media being filled with the fixed data pattern; so, instead of writing this fixed pattern indefinitely, the drive writes it to the end of the track on which the customer data ends (steps 250, 240), then switches to the next track and remains on this track, writing and overwriting the fixed pattern until the next write command is received (step 260). This is preferably conducted with a track write module. Once that write command is received, writing commences immediately and data is written on this track until the end of the track is reached, when the drive switches to the next track as normal and continues writing. FIG. 4c shows the resulting data pattern on two adjacent tracks on the cache disk where a long delay has occurred between the receipt of a first and second write command according to a preferred embodiment of the present invention. Note the maximum length of an area of data padding is slightly less than two tracks.

It will be apparent that it would not be sensible to write a fixed pattern to the end of the first track and to remain on this track until a new write command is received since some of this track is likely to contain customer data. Remaining on the track might cause that data to be overwritten with the fixed data pattern and thus lost.

FIG. 5 shows the cache disk according to a preferred embodiment of the present invention. It will be apparent that the disk has been divided into two regions, region A and region B, each comprising a plurality of tracks. Naturally the invention is not limited to just the two regions, nor as regards to the particular configuration/layout of those regions. When the adapter writes to this disk, it does not specify an LBA, but rather a region. It will be appreciated that in all other aspects the cache disk is the same as an ordinary customer disk. The reasoning behind such a division will be explained with reference to FIG. 6.

Figure 6:
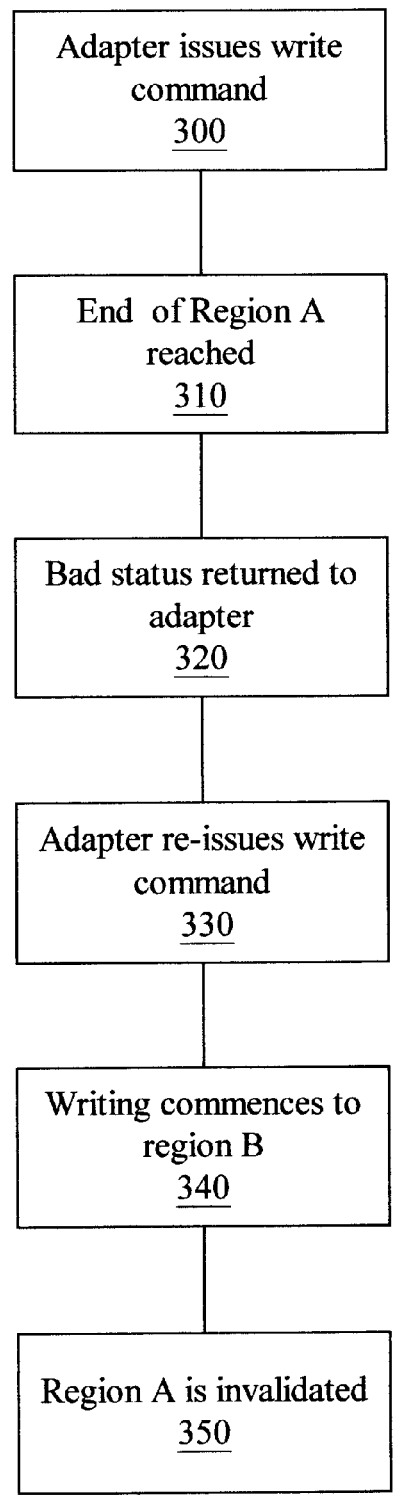
FIG. 6 illustrates disk region switching according to a preferred embodiment of the present invention.

FIG. 6 illustrates disk region switching according to a preferred embodiment of the present invention. The adapter 20 keeps issuing write commands as appropriate (step 300) to a specific region (A, in this example) until eventually the end of a region is reached (step 310). When this happens, the adapter is informed by the disk drive returning a bad status to a write command, indicating that it cannot fit the data for that write command into the space remaining in that region (step 320). The adapter then reissues the write command, specifying the new region (i.e., region B) (step 330). Subsequent writes all specify this new region and the process continues, with data and padding being written to this second region (step 340). As soon as writing has begun to region B, region A is invalidated. This means ensuring that all data within the region has been destaged to the appropriate customer disks so that this region of the cache disk can be overwritten with subsequent data once region B has been filled. The adapter, preferably with an invalidation module, ensures that region A is fully invalidated before write operations have filled region B and vice versa. Separating the two functions of writing and invalidating ensures that writes to region B can continue sequentially without being disrupted by the invalidation process.

The data is destaged from the adapter's on-board cache using a cache directory maintained internally by the adapter. This comprises details of each transaction that is stored in the cache for processing by the adapter. The data in the adapter's cache (i.e., that which has been mirrored to region A) is destaged to the relevant customer disk. Hence the corresponding data on the first region of the cache disk becomes redundant. Once the adapter has flushed all of the data from the first region, this first region is available for writing again. In general the disk regions would be much larger than the adapter cache so the first region would be available for re-use before the second has been fully written, even taking account of the space used for the padding data.

Figure 7:
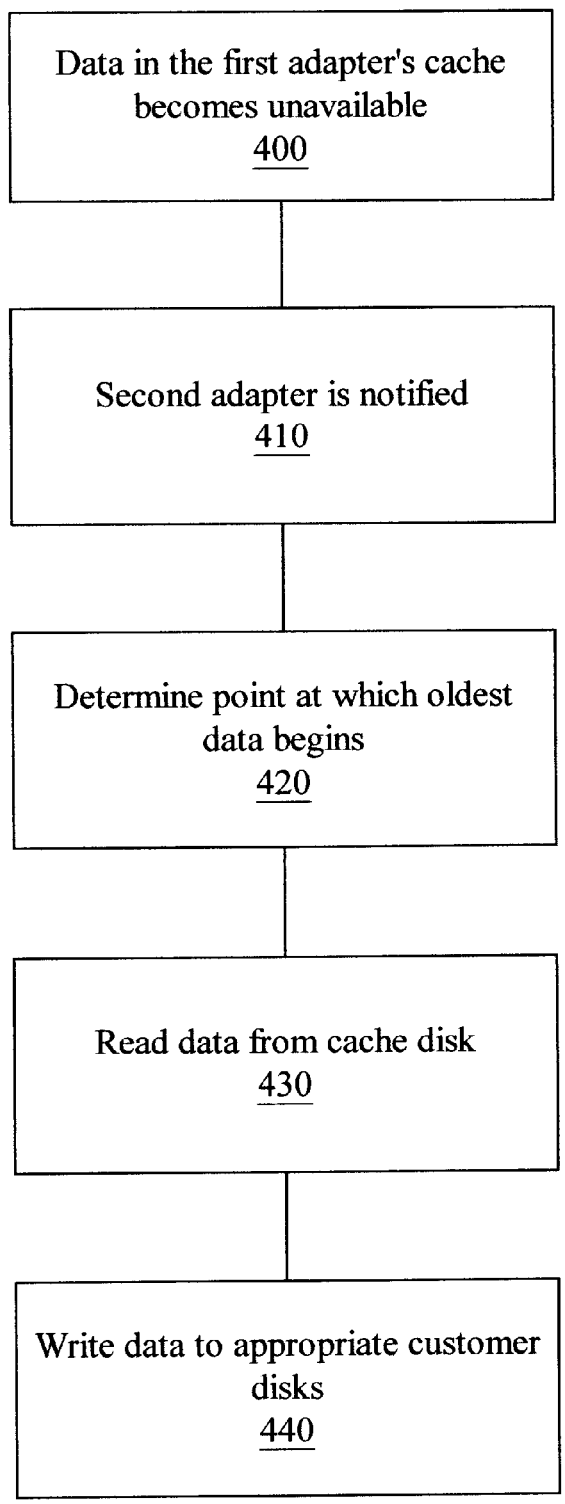
FIG. 7 is a flow chart of the sequence of events that occur when data in the adapter's onboard cache becomes unavailable according to a preferred embodiment of the present invention.

FIG. 7 is a flow chart of the sequence of events that occur when data in the adapter's onboard cache becomes unavailable according to a preferred embodiment of the present invention. The first adapter's 20 cached data becomes unavailable at step 400. Note this might be for any number of reasons, including a faulty card, the host being powered down, etc. In the event of such a failure, it is desirable to be able to recover any data that was stored in the adapter's cache (and of course also present in the disk cache) which hadn't yet been destaged to the appropriate customer disk. According to the preferred embodiment, this data is recovered by the second adapter 80. Thus, the second adapter is notified at step 410 of the unavailability of the data by means of a network event.

Figure 8:
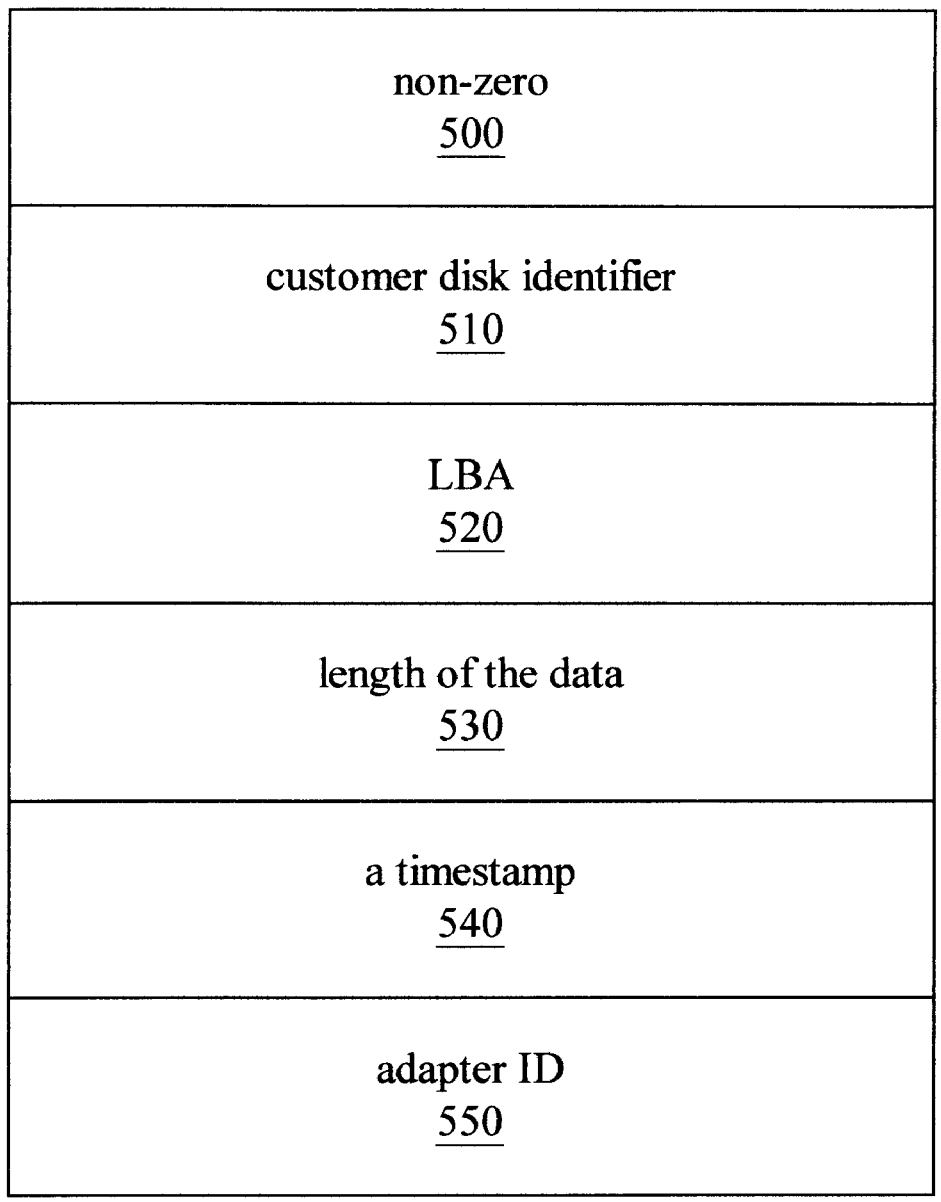
FIG. 8 shows the contents of a write transaction header block according to a preferred embodiment of the present invention.

To enable a second adapter to retrieve data on the cache disk, the data is self-describing. According to the preferred embodiment, each customer data block is prepended with a header block as mentioned above. FIG. 8 shows the contents of such a header. As can be seen, the header includes: a non-zero field 500 (i.e., to ensure that customer data can be distinguished from padding data); a customer disk identifier 510; an LBA 520; the length of the following data 530; a timestamp 540; and, optionally, an adapter identifier 550. Naturally, this requires the cache disk to be formatted to a larger block size than is used for customer data.

In an alternative embodiment, the data is prepended for each write transaction with a single block header describing the data (as above). This involves an overhead of one block per transaction so the relative efficiency of the two options depends on the average length of the cached write transactions.

Either embodiment may include a data validation pattern as part of the header. It will be apparent that in either case the header is typically protected by the normal data protection mechanisms inside the disk drive (e.g., parity, Error Correcting Code, Cyclic Redundancy Check (CRC) code, Longitudinal Redundancy Check, etc.); but, since an undetected error in the header would cause a large data error (since the wrong LBA, the wrong drive number or the wrong length would each cause many blocks to be written incorrectly), then the additional protection of a separate pattern on each header is still justified. Preferably CRC is used, but the invention is not limited to such. Any of the examples given above with reference to the normal data protection mechanisms inside the disk drive may be used, or indeed any other pattern which serves a similar function.

Note a typical block comprises 512 bytes. Disk manufacturers are not always flexible regarding block size and it may be preferable therefore to dedicate a whole 512 byte block to the header. Alternatively, if block size wasn't a problem, then a larger size could be used and a portion of it allocated to the header contents.

According to the preferred embodiment, in order to destage any new data to the customer disk, the second adapter 80 needs to determine the point on the media at which the transition from newest to oldest data occurs. Since the original adapter has failed, the new adapter has to do this using only the information it already holds plus the information on the media of the cache disk.

Thus, according to the preferred embodiment, the second adapter 80 reads the headers blocks (see FIG. 8) in both regions in order to determine the point at which a timestamp in the header wraps (i.e., where the oldest data starts) (step 420). The second adapter then reads all the customer data on the cache disk (step 430), starting with the oldest data, and writes it out in order to the appropriate customer disks (step 440). Of course this may result in the same blocks being written more than once. However, as long as transactions are performed in the correct order (i.e., oldest data first), then this should not cause a problem. After it has processed the newest header, it has reconstructed all the data as originally written by the host. Naturally there would be some duplication of effort with this solution; but since such an operation is usually performed infrequently, this is not a concern.

Alternatively, the second adapter may scan the cache disk and create itself a cache directory of all the data contained within. It may then, for example, coalesce writes to adjacent LBAs and discard multiple writes to the same LBAs, etc. Of course, this operation may in itself take longer than writing out all the data.

Note, in order to prevent accidental customer data loss due to a customer disk receiving a cache write command, these cache write commands may be explicitly enabled in the cache disk during subsystem initialisation. This could be, for example, via a Mode Select setting.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalence of the claims are to be embraced within their scope.

What is claimed is:

1. A method for caching data in a data processing system including a host computer and a storage subsystem including at least one customer disk and a cache disk, said method comprising:

receiving write transactions specifying data to be written to the at least one customer disk;

caching said write transactions in a volatile memory of said storage subsystem;

writing said cached write transactions to the cache disk, the cache disk divided into at least a first and second track, said writing step including:

when transaction data is available, writing said transaction data sequentially to the first track of the cache disk;

when transaction data is unavailable, writing padding data sequentially to the first track of the cache disk;

in response to transaction data being unavailable, switching to the second track after reaching the end of the first track while writing padding data;

in response to transaction data being unavailable, remaining on the second track, and continuously writing and overwriting padding data on the second track without moving to a subsequent track; and in response to transaction data becoming available, writing transaction data on the second track directly under an actuator head upon receiving the transaction data.

2. The method of claim 1, further comprising at least two regions dividing the cache disk, wherein writing said cached write transactions to the cache disk further comprises filling the first of said at least two regions with transaction and padding data as appropriate, before writing to another of said at least two regions.

3. The method of claim 2, further comprising, at a point subsequent to the first region being filled with data, but before the last of said at least two regions is completely filled with data, invalidating said first of the at least two regions, such that said first region is ready to receive new data by the time the other regions are full.

4. The method of claim 3, wherein invalidating said first of the at least two regions comprises ensuring that all data contained within said first region has been destaged to said at least one customer disk.

5. The method of claim 1, wherein writing said cached write transactions to the cache disk comprises pre-pending said transaction data with a header, said header for distinguishing said transaction data from said padding data on the cache disk.

6. The method of claim 5, wherein said header comprises details pertaining to said transaction data.

7. The method of claim 6, further comprising, in the event of the unavailability of the data in said volatile memory of the storage system, using said header details to destage the data contained on said cache disk to the appropriate customer disks.

8. A method for caching data in a data processing system including a host computer and a storage subsystem including at least one customer disk and a cache disk, said cache disk being divided into at least a first and a second track, the method comprising:

receiving write transactions specifying data to be written to the at least one customer disk;

caching said write transactions in a volatile memory of said storage subsystem; and writing said cached write transactions to the cache disk, said writing step comprising:

placing on the first track transaction data, before writing to another of said at least first and second tracks:

in response to transaction data being unavailable, switching to the second track after reaching the end of the first track while writing padding data;

in response to transaction data being unavailable, remaining on the second track, and continuously writing and overwriting padding data on the second track without moving to a subsequent track; and in response to transaction data becoming available, writing transaction data on the second track directly under an actuator head upon receiving the transaction data.

9. The method of claim 8, further comprising, at least two regions dividing the cache disk, and at a point subsequent to the first region being filled with data, but before the last of said at least two regions is completely filled with data, invalidating said first of the at least two regions, such that said first region is ready to receive new data by the time the other regions are full.

10. The method of claim 9, wherein invalidating said first of the at least two regions comprises ensuring that all data contained within said first region has been destaged to said at least one of said customer disks.

11. An apparatus for caching data in a storage subsystem including at least one customer disk and a cache disk, said apparatus comprising:
   a volatile memory;
   means for receiving write transactions specifying data to be written to the at least one customer disk;
   means, responsive to the receipt of said write transactions, for caching said write transactions in said volatile memory; and
   means for writing said cached write transactions to the cache disk, the cache disk divided into at least a first and a second track, said writing means comprising:
      means for writing write transaction data, when available, sequentially to the first track of the cache disk; and
      means for writing said padding data sequentially to the first track of the cache disk only when transaction data is unavailable;
      means for switching to the second track after reaching the end of the first track while writing padding data and after writing transaction data to the first track, in response to transaction data being unavailable;
      means for remaining on the second track, and continuously writing and overwriting padding data on the second track, in response to transaction data being unavailable and has not been written on the second track; and
      means for writing transaction data in the second track directly under a relevant actuator head upon receiving the transaction data, in response to transaction data being available for the first time in the second track.

12. The apparatus of claim 11, said writing means further comprising:
   means for dividing the cache disk into at least two regions;
   means for filling the first region with transaction and padding data as appropriate, before writing to another of said at least two regions.

13. The apparatus of claim 12, further comprising:
   means for invalidating said first of the at least two regions at a point subsequent to the first region being filled with data but before the last of said at least two regions is completely filled with data, such that said first region is ready to receive new data by the time the other regions are full.

14. The apparatus of claim 13, wherein said invalidation means ensures that all data contained within said first region has been destaged to said at least one of said customer disk.

15. The apparatus of claim 11, wherein said writing transaction data means further comprises:
   means for pre-pending said transaction data with a header, said header for distinguishing said transaction data from said padding data on the cache disk.

16. The apparatus of claim 15, wherein said header comprises details pertaining to said transaction data.

17. The apparatus of claim 16 comprising:
   means for using said header details to destage the data contained on said cache disk to the appropriate customer disks in the event of the unavailability of the data in said volatile memory of the storage subsystem.

18. An apparatus for caching data in a storage subsystem including at least one customer disk and a non-volatile cache, said apparatus comprising:
   a volatile memory;
   an adapter comprising a write transaction module configured to receive write transactions specifying data to be written to the at least one customer disk;
   the adapter further comprising a caching module configured to, responsive to the receipt of said write transactions, cache said write transactions in said volatile memory; and
   the adapter also configured to write said cached write transactions to the non-volatile cache, the non-volatile cache divided into at least a first and a second track, the adapter further comprising:
      a write transaction writing module configured to write transaction data, when available, sequentially to the first region of the non-volatile cache;
      a padding module configured to write said padding data sequentially to the first region of the non-volatile cache only when transaction data is unavailable;
      a switching module configured to switch to the second track after reaching the end of the first track while writing padding data when transaction data has been written to the first track, and transaction data is unavailable;
      a remaining module configured to remain on the second track and continuously write and overwrite padding data in the second region in response to transaction data being unavailable and not yet written in the second track; and
      a writing transaction data module configured to write transaction data on the second track substantially directly under a relevant actuator head upon transaction data becoming available.

19. The apparatus of claim 18, wherein the cache disk is divided into at least two regions, and the write transaction writing module is further configured to fill the first of said at least two regions with transaction and padding data as appropriate, before writing to another of said at least two regions.

20. The apparatus of claim 19, further comprising:
   an invalidation module configured to invalidate said first of the at least two regions at a point subsequent to the first region being filled with data but before the last of said at least two regions is completely filled with data, such that said first region is ready to receive new data by the time the other regions are full.

21. The apparatus of claim 20, wherein said invalidation module is further configured to ensure that all data contained within said first region has been destaged to said at least one of said customer disks.

22. A storage subsystem for caching data, comprising:
   at least one customer disk;
   a cache disk;
   a volatile memory;
   an adapter comprising a write transaction module configured to receive write transactions specifying data to be written to the at least one customer disk;
   the adapter further comprising a caching module configured to, responsive to the receipt of said write transactions, cache said write transactions in said volatile memory;
   the adapter also configured to write said cached write transactions to the cache disk, the cache disk divided into at least a first and a second track, and further comprising:
      a first write transaction writing module configured to write transaction data, when available, sequentially to the first track of the cache disk;

a padding module configured to write said padding data sequentially to the first track of the cache disk only when transaction data is unavailable a switching module configured to switch to the second track after reaching the end of the first track while writing padding data and in response to transaction data being written to the first track, when transaction data is unavailable;

a remaining module configured to remain on the second track, and continuously writing and overwriting padding data in the second region, in response to transaction data being unavailable and has not been written in the second track; and a second writing transaction data module configured to writing transaction data on the second track directly under a relevant actuator head upon receiving the transaction data, in response to transaction data becoming available and has not been written in the second track.

23. A data storage device having at least a first and a second track for storing data, comprising:

a switching module configured to switch to the second track after reaching the end of the first track while writing padding data and when transaction data has been written to the first track, when transaction data is unavailable;

a remaining module configured to remain on the second track, and continuously writing and overwriting padding data in the second track, when transaction data is unavailable and has not been written in the second track; and a writing transaction data module configured to writing transaction data on the second track directly under a relevant actuator head immediately upon receiving the transaction data, when transaction data is available and has not been written in the second track.

24. A method for storing data on a data storage device having at least a first and a second track for storing data, comprising:

switching to the second track after reaching the end of the first track, when transaction data is unavailable, and after transaction data has been written to the first track;

remaining on the second track, and continuously writing and overwriting padding data on the second track, when transaction data is unavailable and when no transaction data has been entered on the second track; and writing transaction data on the second track directly under a relevant actuator head immediately upon receiving the transaction data, when transaction data is available while writing and overwriting padding data on the second track.

* * * * *

UNITED STATES PATENT AND TRADEMARK OFFICE
CERTIFICATE OF CORRECTION

PATENT NO.    : 6,766,414 B2
DATED         : July 20, 2004
INVENTOR(S)   : Francis et al.

It is certified that error appears in the above-identified patent and that said Letters Patent is hereby corrected as shown below:

Column 3,
Line 26, "be swapped in in" should read -- be swapped in --
Line 31, "substituted in in" should read -- substituted in --
Line 57, "to provide an" should read -- to provide --

Column 4,
Line 43, "writes to one region" should read -- writing to one region --

Column 13,
Line 15, "writing transaction" should read -- write transaction --

Signed and Sealed this

Twenty-third Day of November, 2004

JON W. DUDAS
*Director of the United States Patent and Trademark Office*